Sept. 14, 1926.
C. F. M. VAN BERKEL
1,599,694
SCALE ATTACHMENT FOR SLICING MACHINES
Filed April 7, 1926    2 Sheets-Sheet 1
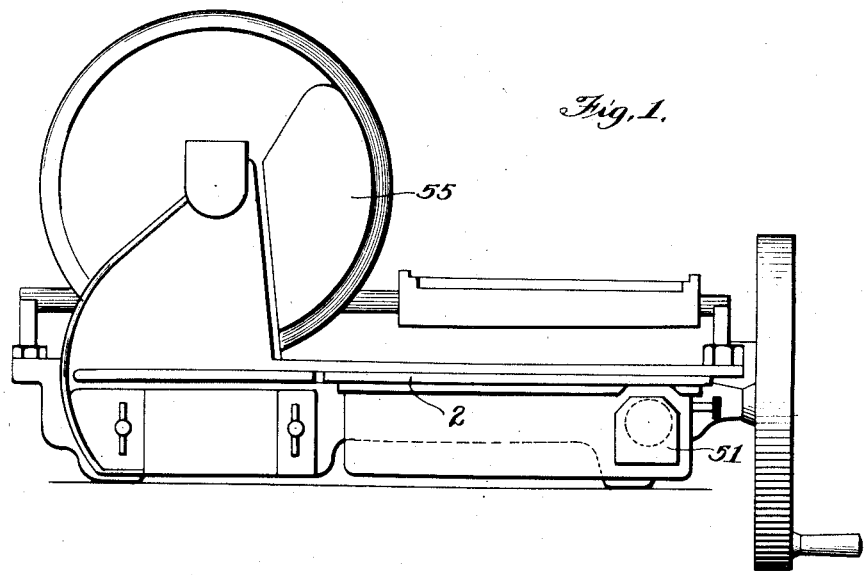
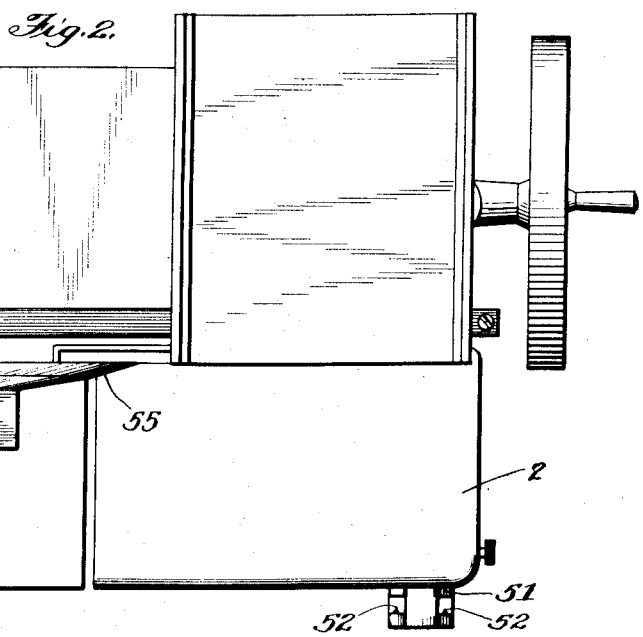
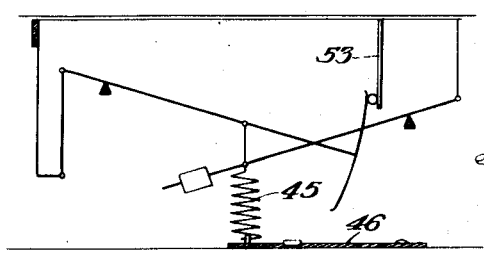
Inventor
Cornelis F.M. van Berkel
By Nissen & Crane
Attys.

Patented Sept. 14, 1926.

1,599,694

UNITED STATES PATENT OFFICE.

CORNELIS FRANCISCUS MARIA VAN BERKEL, OF WASSENAAR, HOLLAND, ASSIGNOR TO U. S. SLICING MACHINE COMPANY, OF LA PORTE, INDIANA, A CORPORATION OF INDIANA.

SCALE ATTACHMENT FOR SLICING MACHINES.

Application filed April 7, 1926. Serial No. 100,265.

This invention relates to a scale attachment provided with two beam parts, and particularly to a rapidly operating scale which is constructed as a basket or pan scale.

The invention has as one object the provision of a frame which in its entirety may easily be assembled with a meat cutting machine, or which may readily be placed onto the same in such position that the merchandise delivered from the slicing machine is directly deposited on the scale pan.

The invention is exemplified in the combination and arrangement of parts shown in the accompanying drawings and described in the following specification, and it is more particularly pointed out in the appended claims.

In the drawings,

Fig. 1 is a front elevation showing a slicing machine having the present invention applied thereto.

Fig. 2 is a top plan of the device of Fig. 1.

Fig. 5 is a diagrammatic view of a modified form of scale.

According to the invention the scale frame is provided with a suitable pan or plate, which, in case the scale is combined with a meat cutting machine, is arranged to take the place of the customary delivery table of the slicing machine. The scale is located in such position that the space occupied by the entire combination of scale and slicing machine is approximately equal to that of the meat slicing machine without scale, the scale frame being adapted to be attached to the frame of the slicing machine in the position commonly occupied by the slice receiving table.

According to the invention the beams on which the scale pan carriers rest are connected by means of a shackle, link, a strip of steel, or the like, with each other so as to be freely movable. Upon the use of a shackle or the like, the shackle is provided with bearings to receive the fulcrum parts, said fulcrum parts being associated with the beams, in order to reduce the vibrating movements to a minimum.

According to the invention, furthermore, the fulcrum parts are urged by weights against the associated fulcrum bearings whereby the shackle or link is maintained at a predetermined pressure relative to the fulcrum parts.

Figure 3:
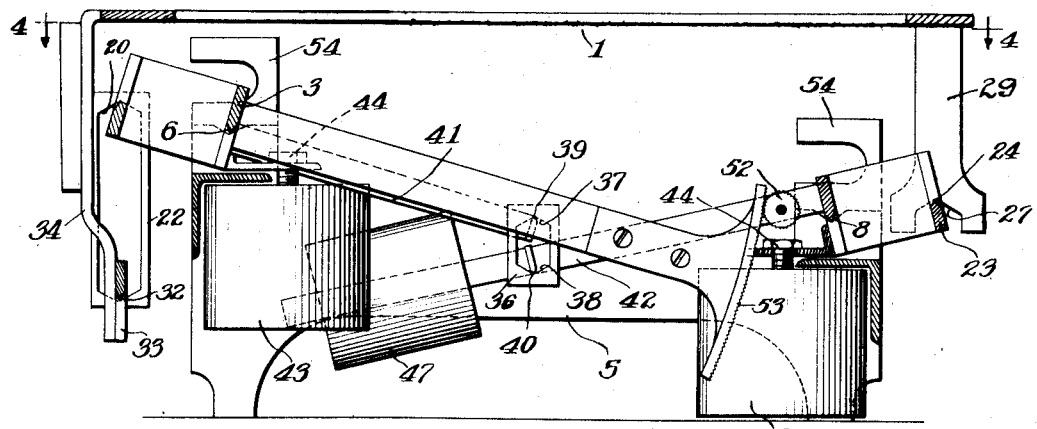
Fig. 3 is a vertical section on line 3—3 of Fig. 4, showing the scale mechanism.
Figure 4:
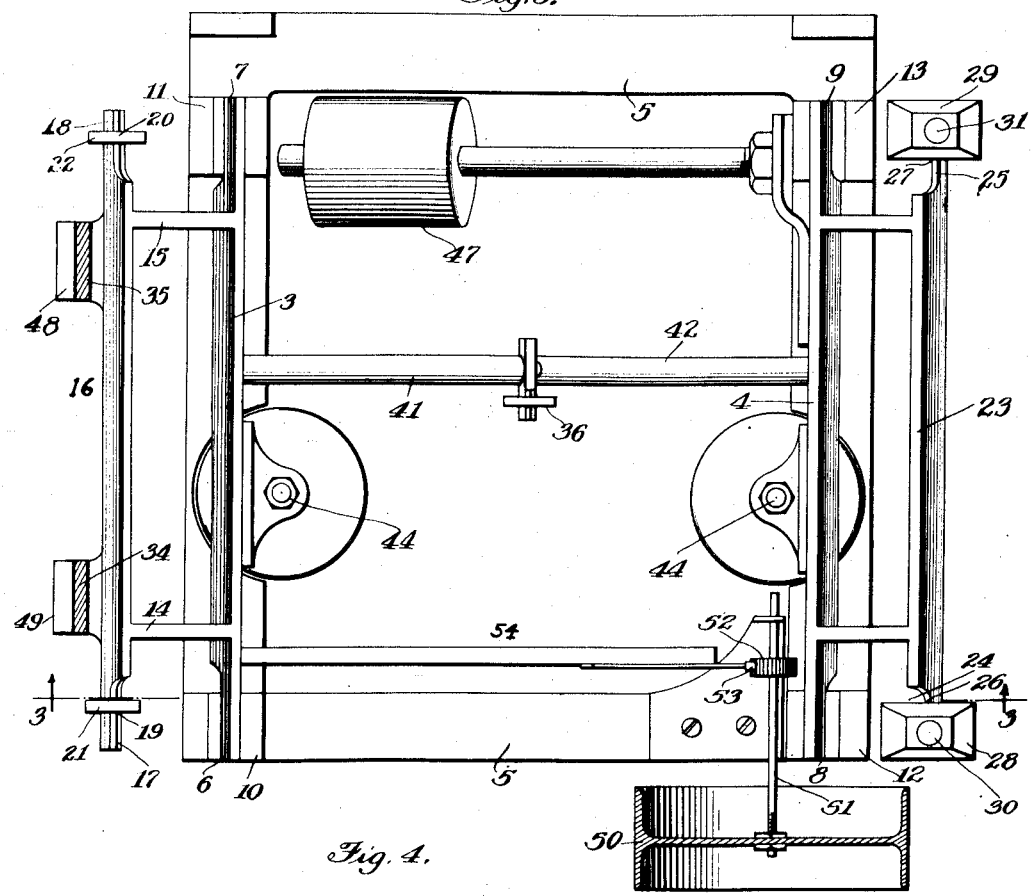
Fig. 4 is a section on line 4—4 of Fig. 3.

The weight forcing the top knife edge against its seat may be formed in this invention by the scale pan itself, not shown in Figs. 3 and 4 of the drawings.

In order to avoid objectionable tilting or wobbling as much as possible, the pan carrier of the invention is suspended at one side by means of one or more freely movable links carried on the corresponding scale lever, and at the other side it is supported on the associated scale lever by one or more connections fixed to the scale pan support but pivotally disposed upon the corresponding beam or lever. It is obvious that through this embodiment the wobbling or vibrating movement of the scale pan is reduced to a minimum.

According to the invention the counterbalancing weights are directly connected with the beams or levers, and are axially adjustable to permit adjustment of their turning movement. When in place of weights, springs are utilized as counterbalancing elements, they cooperate with one or more thermostats, assuring that in condition of rest of the frame the zero position of the indicator will be presented at all times. The indicating mechanism according to the invention, comprises one or more stationary indicators which cooperate with a rotatable indicator plate or chart actuated by the weighing mechanism, said chart being provided with a weight indicating graduation.

The indicator mechanism, according to the invention, may also be influenced directly through the goods pan.

The indicating mechanism is approximately at the height of the goods pan, whereby the mechanism located on the goods pan can readily be removed.

Owing to the combination of the above named features and those which will be indicated further down, a compact attachment is created which is of great advantage in combination with meat slicing machines.

On the frame 1 of the scale made according to this invention, there rests the ordinary goods receiving plate or scale pan 2. At 3 and 4 transverse bars are indicated, said bars being supported at four corners of the base frame 5 by means of knife edges 6, 7, 8 and 9, respectively, resting an agate bearings 10, 11, 12 and 13, fixedly located at the said corners. The bar 3 is connected by cross bars 14 and 15 with a bar 16 having two knife edges 17 and 18 at the ends thereof, said knife edges resting in bearings 19 and 20 on the upper ends of freely movable shackles 21 and 22.

In a similar way the bar 4 is connected to a bar 23 which has two knife edges 24 and 25 cooperating with the fulcrum bearing 26 and 27. These bearings form parts of supports 28 and 29 fixed to the frame 1 by screws engaging threads of openings 30 and 31. By means of the knife edges 32 there is supported in the shackles 21 and 22 a longitudinal bar 33, which is fastened to the frame 1 by means of two brackets 34 and 35.

The two bars 3 and 4 are interconnected, so as to be freely movable together, by means of a shackle 36. In order to limit the vibrating movement to a minimum, the connecting shackle 36 is provided with bearings 37 and 38 wherein the knife edges 39 and 40 rest, the knife edges being carried on levers 41 and 42 connected with the bars 3 and 4. As may be seen from the drawings, these levers 41 and 42 extend through the middle portion of the scale frame.

In order to counterbalance the load on the scale pan there is secured to each cross bar 3 and 4 a weight 43, each of which may be adjusted through a nut 44, so as to be higher or lower, with the intention of providing means for varying the turning moment of the structure.

In Fig. 5 there is shown in place of the weights, a spring 45 which cooperates with a thermostat so that in normal condition at all times the zero position of the indicator is maintained.

The counterbalancing of the top plate 2 is effected by a weight 47. In order to retain the upper knife edge 39 within the pertaining bearing 37 of the connecting shackle 36, the bearings 34 and 35 have weights 48 and 49 attached to them. In the same way the lower knife edge 40 is held down by the weight 47. The weights 48 and 49 may also be formed by simply extending the top plate 2 on the respective side downward, for instance by causing it to project beyond the side of the frame 1.

The indicating device for the attachment, according to the invention, consists of a chart in the form of a rotatable drum 50, which is actuated by means of its shaft 51 and a pinion 52 secured thereto, the pinion being in engagement with a toothed sector 53 carried on an arm 54 secured to the bar 3.

Figure 1 shows one way in which the weighing attachment of the invention cooperates with a slicing machine 55, the scale pan 2 being located in the place of the customary delivery plate, so that the projection or outline of the entire assembly is about the same as that of the machine without the weighing attachment, or, in other words, the space which a meat slicing machine provided with the novel weighing attachment occupies is not much more than the space occupied by a machine of this kind without the weighing attachment.

The indicator wheel 50 is inclosed in a housing 51 having indicator 52 cooperating with the indicating chart, there being one indicator for the customer and one for the salesman.

In Fig. 5 there is indicated at 53 a rack bar by means of which the indicating device may be directly actuated from the scale pan 2 in place of one of the beams. 54 are brackets by which the base frame may be attached to the frame of a slicing machine. It is obvious that the proportions of the arms of the beams, the size of the weights, etc., are so that the whole attachment is nicely counterbalanced.

I claim:

1. A weighing scale comprising a supporting base, fulcrum blocks positioned at four corners of said base, a pair of substantially parallel bars each having the opposite ends thereof fulcrumed on two of said blocks, means offset relatively to the axes of said bars for supporting a weight receiving platform, and weights secured to said bars for counterbalancing a load on said platform, said weights being offset relative to the axes of said bars at the opposite sides of said axes from said platform supporting means.

2. A weighing scale comprising a supporting base having fulcrum blocks positioned at four corners thereof, a pair of bars having opposite ends thereof fulcrumed on said blocks, means connected with said bars extending outwardly therefrom, a platform having a fixed bearing member secured thereto and pivoted on the outwardly extending means of one of said bars, a link suspended from the outwardly extending means on the other of said bars, a supporting member fixed to said platform and pivotally engaging said link, and counterbalancing weights secured to said bars.

3. A weighing scale comprising a pair of substantially parallel fulcrumed bars, supports projecting outwardly from said bars, a weight supporting platform carried on said supports, counterbalance weights connected with said bars at the sides thereof opposite said supports, and means for vertically adjusting said counterbalance weights.

4. A weighing scale comprising a pair of substantially parallel fulcrumed bars, supports projecting outwardly from said bars, a weight supporting platfrom carried on said supports, counterbalance weights connected with said bars at the sides thereof opposite said supports, means for vertically adjusting said counterbalance weights, and means for restraining said bars to move in unison with each other.

5. A weighing scale comprising a pair of substantially parallel fulcrumed bars, supports projecting outwardly from said bars, a weight supporting platform carried on said supports, counterbalance weights connected with said bars at the sides thereof opposite said supports, means for vertically adjusting said counterbalance weights, means for restraining said bars to move in unison with each other, an arm extending inwardly from one of said bars, and a counterweight carried on said arm.

6. The combination with a slicing machine having a slicing knife and reciprocating table, of a weighing scale having a weight receiving platform adjacent the path of movement of said table but below the level of the top of said table, and an indicator for said scale disposed near the level of the top of said platform.

7. The combination with a slicing machine having a slicing knife, a supporting frame and supporting means for said knife projecting from the cutting plane of said knife and forming with said frame an angular recess, and a weighing scale having a weight receiving platform disposed in said recess.

In testimony whereof I have signed my name to this specification on this 11th day of March, A. D. 1926.

CORNELIS FRANCISCUS MARIA van BERKEL.